United States Patent [19]

Coatantiec

[11] 4,291,909
[45] Sep. 29, 1981

[54] CLAMPING JAWS ASSEMBLY

[75] Inventor: Alain Coatantiec, Bruz, France

[73] Assignees: Société Anonyme Automobiles Citroen; Automobiles Peugeot, both of Paris, France

[21] Appl. No.: 145,484

[22] Filed: May 1, 1980

[30] Foreign Application Priority Data

May 22, 1979 [FR] France ............................. 79 13910

[51] Int. Cl.³ .......................... B25J 15/00; B66C 1/42
[52] U.S. Cl. ...................................... 294/88; 414/753
[58] Field of Search ................ 294/88, 104, 106, 115; 414/739, 751, 753

[56] References Cited

U.S. PATENT DOCUMENTS

| 2,828,998 | 4/1958 | Seelye | 294/88 |
| 2,901,126 | 8/1959 | Halberstadt | 294/88 X |
| 3,013,835 | 12/1961 | Blatt | 294/88 |
| 3,312,496 | 4/1967 | Boutelle et al. | 294/88 X |
| 3,714,870 | 2/1973 | Blatt | 294/88 X |

FOREIGN PATENT DOCUMENTS 499091  4/1976  U.S.S.R. ............................. 294/88

*Primary Examiner*—Johnny D. Cherry
*Attorney, Agent, or Firm*—Karl F. Ross

[57] ABSTRACT

Clamping jaws assembly includes an elongate arm carrying pivotally at one end thereof a clamp body which itself supports pivotally two jaws on spaced parallel axes and a rod inter-connecting the jaws to limit their opening movement.

A double-acting actuator connects one of the jaws and the arm and a telescopic, spring-loaded, device inter-connects the clamp body and the arm.

The actuator serves to pivot one of the jaws in relation to the other and beyond a predetermined part of its stroke also causes the whole of the clamp body to pivot about the arm so as to move outward of the plane on which the jaws take up workpieces.

5 Claims, 4 Drawing Figures

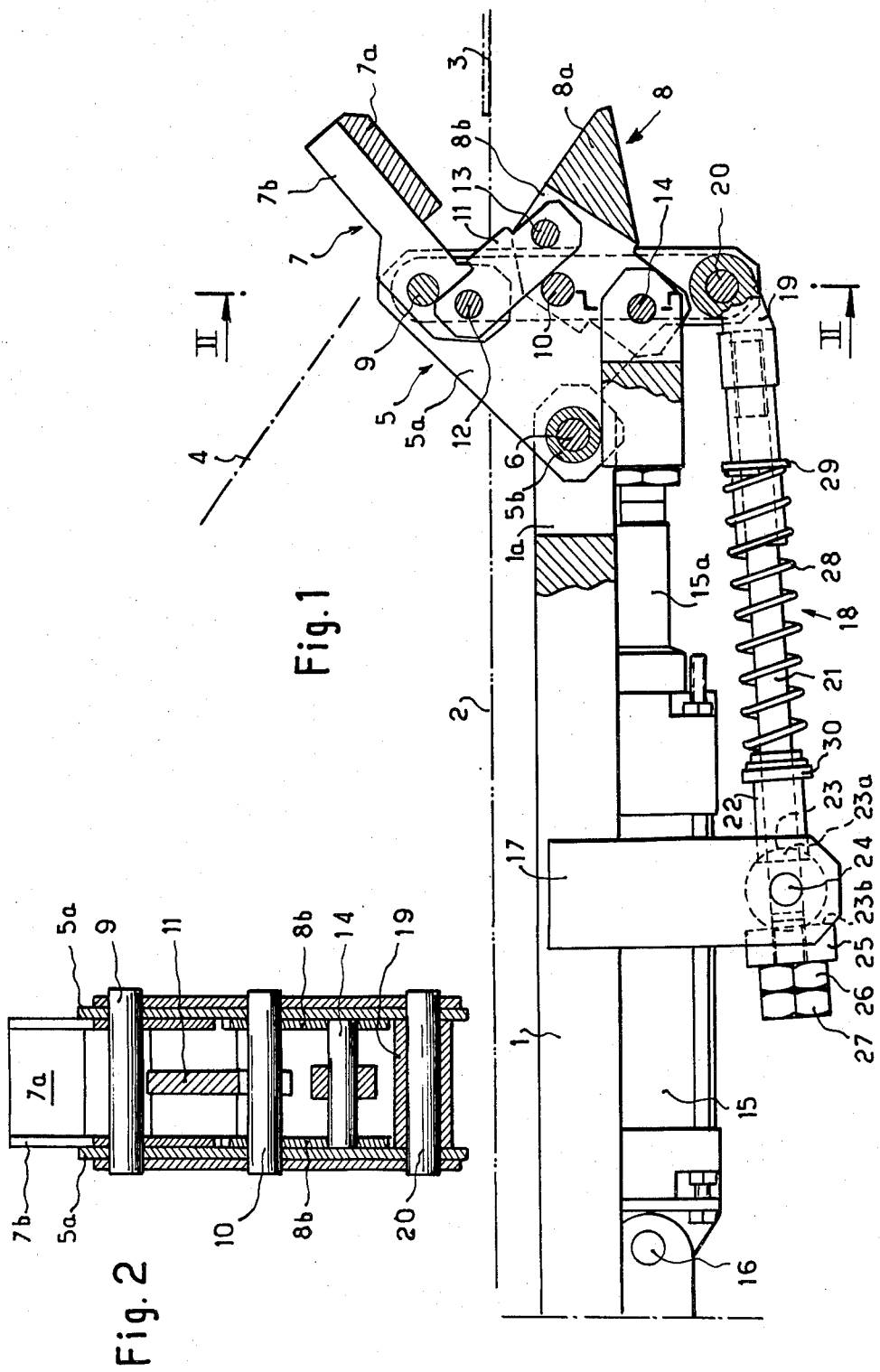

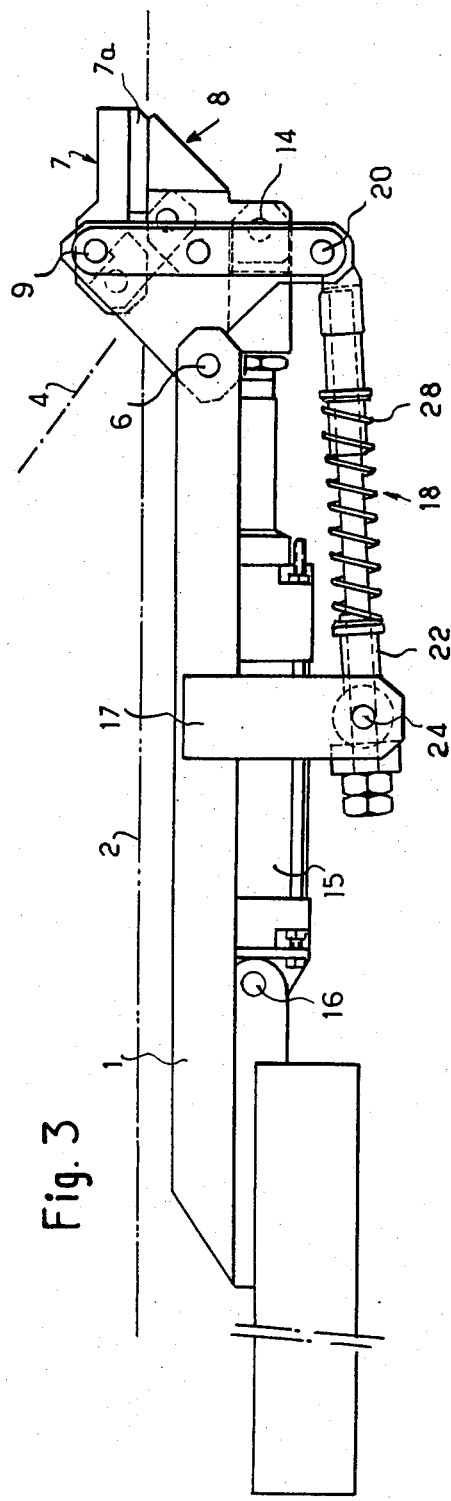
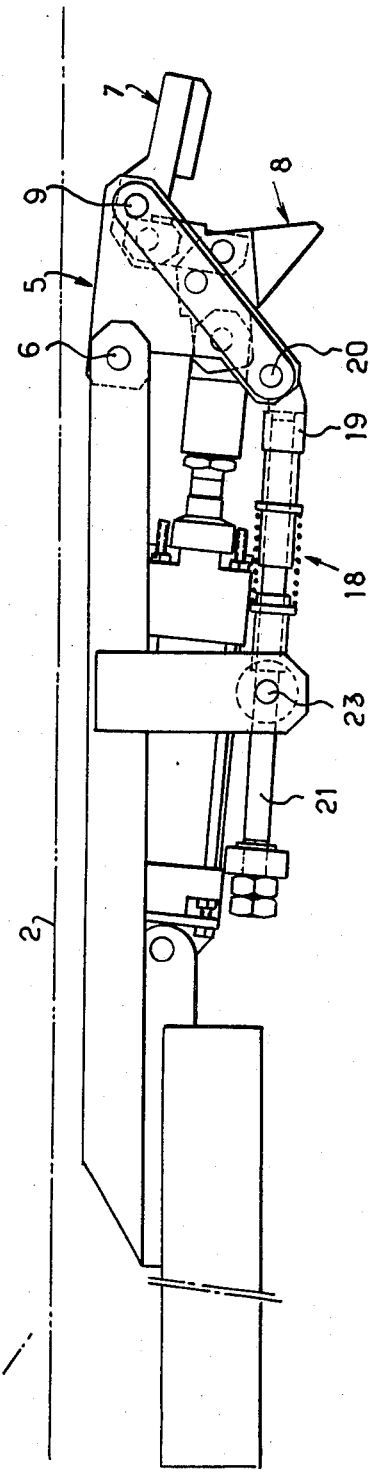

4,291,909

CLAMPING JAWS ASSEMBLY

BACKGROUND OF THE INVENTION

1. Field of the Invention

This invention relates to a clamping jaws assembly.

2. Summary of the Prior Art

In order to supply an apparatus such as a press with parts, for example, of sheet metal, a clamp is often used which grips the parts and moves them towards the operating members of the apparatus in a loading plane. After having moved and then released the part, the clamp returns to its initial position so that it can subsequently grip a fresh part. However, the return movement of the clamp interferes with the positioning of this fresh part in the loading plane, and it has hitherto been necessary to allow the clamp to return to its initial position before the fresh part can be located ready to be taken up by the clamp assembly.

The present invention has for its object a clamp assembly which is removed wholly beneath the loading plane during its return movement which enables the part to be loaded to be located in position while the return movement of the clamp is being effected or even during its outgoing movement; the time required for loading the part is thus substantially reduced.

SUMMARY OF THE INVENTION

According to the present invention there is provided in a clamp assembly an elongate arm, a clamp body pivoted to the arm at one end of the latter, said body carrying two pivotal jaws and rod means pivotally interconnecting the jaws and serving to limit opening movement of the jaws, double-acting actuator means interconnecting one of the jaws and the arm, and a telescopic, spring-loaded, device interconnecting the said clamp body and the arm, said actuator means and the telescopic, spring-loaded, device being operative to control opening and closing of the jaws and to pivot the body as a whole.

A clamp in accordance with the invention is located beneath the loading plane of the related apparatus in the region of an elongate opening provided in the plane so that, when the two chambers of the hydraulic actuator are open to the ambient air, the body of the clamp projects partially above this plane, and the two jaws lie in an open position above and below the plane. By actuation of the jack in the appropriate sense, the two jaws close upon the object to be fed to the apparatus. At the end of the movement, the jack is actuated in the opposite sense, which has the effect initially of opening the jaws, then when the latter are in the maximum opening position, cause the body of the clamp to pivot downwardly whilst compressing the telescopic device. The body of the clamp is thus returned wholly beneath the loading plane, which enables the jaws to be returned to their initial position while a fresh object is placed on the said plane. When the jaws again lie in their initial positions, the ambient air is admitted to the two chambers of the jack. The telescopic device then extends and pivots the body of the clamp upwardly, the jaws remaining in the open position.

BRIEF DESCRIPTION OF THE DRAWINGS

FIG. 1 shows one embodiment of a clamp in accordance with the invention in the open position, as a partially sectioned side elevation;

FIG. 2 is a section on the line II—II of FIG. 1;

FIG. 3 shows in side elevation the clamp in the loaded position; and

FIG. 4 shows in side elevation the clamp in a position ready for return to an initial position.

DESCRIPTION OF THE PREFERRED EMBODIMENT

As is shown in FIG. 1, a clamp according to the invention comprises a clamp support arm 1 movable longitudinally beneath a loading plane 2 (chain lines) on to which a sheet metal member 3 can be discharged from an inclined plane 4 (again indicated by a chain line).

The end of the arm 1 is in the form of a clevis 1a and a body 5 of the clamp is pivoted thereon by a pin 6. The body 5 of the clamp is formed by two plates 5a interconnected by a cylindrical member 5b traversed by the pin 6. An upper jaw 7 and a lower jaw 8 are pivoted within the body of the clamp 5 respectively on pins 9 and 10. The upper jaw 7 is constituted by a part 7a having substantially the shape of a parallelopiped and which acts as one tip of the jaws, and two flanges 7b which are disposed on either side of the tip 7a and which are traversed by the pin 9. For its part, the lower jaw 8 comprises a part 8a in the shape of a triangular prism which serves as the other tip and two flanges 8b traversed by the pin 10. The two jaws are interlinked by a link 11 of which the ends are pivoted on the jaws respectively at 12 and 13.

The lower jaw 8 is also connected by a pin 14 to the rod 15a of a piston of a double-acting hydraulic actuator 15 which is pivotally mounted by a pin 16 on the arm 1.

The body of the clamp 5 is connected to two plates 17 rigid with the arm 1 by a telescopic, spring-loaded, device denoted generally by the reference 18. This device comprises an arm 19 which is pivotally mounted at 20 on the body of the clamp 5 and on which is secured a rod 21 movable within a sleeve 22. This sleeve is welded to a cylindrical member 23 traversed by the rod 21 and is connected to the plates 17 by two pins 24 (only one shown). The member 23 comprises two plates 23a and 23b of which the first abuts against the sleeve 22, whilst the other forms an abutment, serving to limit the stroke of the rod 21, by cooperation with a thick washer 25 mounted on the rod and secured by a nut 26 and a lock nut 27. A spring 28, interposed between a shoulder 29 of the arm 19 and a shoulder 30 of the sleeve 22, biases the rod of the sleeve to move outwardly and to apply the thick washer 25 against the abutment 23b.

FIGS. 1 and 2 illustrate the clamp in open position; the body of the clamp 5 is accommodated in an elongate opening provided in the plane 2, the two jaws 7 and 8 lying, as shown, above and below the plane.

In operation, the clamp is moved towards a sheet metal member 3 and it is gripped between the jaws 7 and 8. Then, air under pressure is admitted to the side of larger section of the jack 15, that is to say on the side which tends to displace the piston rod 15a of the jack outwardly. The rod 15a then pushes on the pin 14 connecting it to the lower jaw 8a. As the pins 6 and 20 of the clamp body 5 are fixed, this clamp body remains fixed and the jaw 8 then pivots upwardly about the pin 10 thereby moving into the closed position.

During pivoting, the jaw 8 drives the pin 13 which moves over an arc of a circle centred on the axis 10. The pin 12 must lie at a constant distance from the axis of the pin 13. As a result it is constrained to be moved over an arc of a circle centred on the pin 9 while driving the jaw 7 which comes into the closed position on the sheet metal, 3, the sheet metal 3 thus being gripped by the two jaws 7 and 8.

The clamp is then displaced longitudinally so as to bring the sheet metal 3 to the desired position. When the clamp arrives at its destination, pressure fluid is admitted to the jack 15 at the piston rod side, that is to say on the side which tends to cause this rod to return into the body of the jack. Two jaws 7 and 8 are then opened, which enables the release of the sheet metal member 3.

The sheet metal member 3 being released and pressure maintained within the jack, on the side of the piston rod, the two jaws 7 and 8 continue to open until the rod 11 abuts the pin 9, which thus limits the opening movement of the jaws. Starting from this instant, the pin 14 whilst continuing to be moved, causes the body of the clamp to pivot about the pin 6, while compressing the telescopic device 18; the assembly then lies in the position of FIG. 4.

The arm 1 is now returned into its initial position. As the assembly lies below the loading plane 2, a sheet metal member 3 can lie in this plane by being placed selectively either during the movement of forward displacement of the clamp, or during its return movement.

When the clamp has retreated behind the sheet metal part 3 to be loaded, by passing beneath this sheet metal, the two chambers of the jack 15 are opened to ambient air. The telescopic device adapts until the thick washer 25 comes into abutment against the surface 23b of the cylindrical part 23, while causing the body of the clamp 5 to pivot about the pin 6. The two jaws 7 and 8 maintain their position with respect to the body of the clamp and the pin 14 drives the rod of the piston of the jack, which takes up an intermediate position while the jack pivots about the pin 16.

The body of the clamp thus engages into the opening in the plane 2 and the clamp again occupies the position of FIG. 1.

I claim:

1. In a clamp assembly
   an elongate arm,
   a clamp body pivoted to the arm at one end of the latter, said body carrying
     two pivotal jaws and
     rod means pivotally interconnecting the jaws and serving to limit opening movement of the jaws,
   double-acting actuator means interconnecting one of the jaws and the arm, and
   a telescopic, spring-loaded, device interconnecting the said clamp body and the arm,
   said actuator means and the telescopic, spring-loaded, device being operative to control opening and closing of the jaws and to pivot the body as a whole.

2. An assembly according to claim 1, wherein the actuator means is pivotally connected to the jaws and to the arm.

3. An assembly according to claim 1, wherein the axes of the jaws are spaced from one another on said clamp body.

4. An assembly according to claim 1, comprising a clevis and a pin connecting the arm and the clamp body.

5. A clamp assembly comprising
   an elongate arm carrying
     a clevis at one end thereof,
   a clamp body pivoted to the arm by said clevis, said body carrying
     two jaws pivotal on the body about spaced parallel axes,
     rod means pivotally interconnecting the jaws and serving to limit opening movement of the jaws,
   double-acting actuator means pivoted to one of said jaws and pivoted to the arm at a position spaced from the clevis, and
   a telescopic, spring-loaded, device pivotally interconnecting the said clamp body and the arm,
   said actuator means and the telescopic, spring-loaded, device being operative to control opening and closing of the jaws and to pivot the body as a whole.

* * * * *